(12) United States Patent
Chen et al.

(10) Patent No.: US 11,803,208 B2
(45) Date of Patent: Oct. 31, 2023

(54) TIMER CALIBRATION METHOD AND ELECTRONIC DEVICE

(71) Applicant: Hefei Core Storage Electronic Limited, Anhui (CN)

(72) Inventors: Yang Chen, Anhui (CN); Yue Hu, Anhui (CN); Dong Sheng Rao, Anhui (CN); Kuai Cao, Anhui (CN); Qin Qin Tao, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 36 days.

(21) Appl. No.: 17/572,654

(22) Filed: Jan. 11, 2022

(65) Prior Publication Data
US 2023/0185329 A1 Jun. 15, 2023

(30) Foreign Application Priority Data
Dec. 10, 2021 (CN) .......................... 202111509189.3

(51) Int. Cl.
*G06F 1/12* (2006.01)
*G06F 1/08* (2006.01)

(52) U.S. Cl.
CPC . *G06F 1/12* (2013.01); *G06F 1/08* (2013.01)

(58) Field of Classification Search
CPC ..................................... G06F 1/12; G06F 1/08
See application file for complete search history.

(56) References Cited

U.S. PATENT DOCUMENTS

| 2009/0146744 A1* | 6/2009 | Yang ......................... G06F 1/14 331/44 |
| 2016/0246324 A1* | 8/2016 | Mangano .................. H03L 1/00 |
| 2016/0252942 A1* | 9/2016 | Varma ..................... G06F 1/263 713/322 |
| 2018/0048457 A1 | 2/2018 | Dzung et al. |
| 2021/0397212 A1* | 12/2021 | Pambucol .............. G01R 35/04 |

FOREIGN PATENT DOCUMENTS

| CN | 1578255 | 2/2005 |
| CN | 1838800 | 9/2006 |
| CN | 101483432 | 7/2009 |
| CN | 103955256 | 7/2014 |
| CN | 104732049 | 6/2015 |
| CN | 107272821 | 10/2017 |
| CN | 110514785 | 11/2019 |
| CN | 111865465 | 10/2020 |
| CN | 113391539 | 9/2021 |

(Continued)

OTHER PUBLICATIONS

"Office Action of Taiwan Counterpart Application", dated Nov. 28, 2022, p. 1-p. 6.

(Continued)

*Primary Examiner* — Zahid Choudhury
(74) *Attorney, Agent, or Firm* — JCIPRNET

(57) ABSTRACT

A timer calibration method and an electronic device are disclosed. The method includes: performing a fitting operation according to a clock frequency of a clock device and an output of a timer to generate a fitting function; obtaining a first value output by the timer; and adjusting the first value to be a second value according to the fitting function to calibrate the timer.

10 Claims, 2 Drawing Sheets

(56) References Cited

FOREIGN PATENT DOCUMENTS

| | | |
|---|---|---|
| GB | 2393610 | 11/2002 |
| JP | H11223686 | 8/1999 |
| JP | H11271476 | 10/1999 |
| TW | 201424320 | 6/2014 |
| TW | 201732488 | 9/2017 |
| TW | 202013896 | 4/2020 |
| WO | 2014037684 | 3/2014 |
| WO | 2015087751 | 6/2015 |

OTHER PUBLICATIONS

Wang, Yini et al., "Client System of Clock Synchronization Based on Clock Drift Rate", Computer Applications and Software, vol. 26 No. 12, with English abstract, Dec. 2009, pp. 1-4.

Gao Shuai et al., "Application on High Precision Time Interval Measurement in Time Comparison and Frequency Calibration", Modern Navigation 2016 No. 4, with English abstract, Aug. 2016, pp. 239-245.

"Office Action of China Counterpart Application", dated Feb. 27, 2023, p. 1-p. 10.

"Notice of allowance of China Counterpart Application", dated Aug. 1, 2023, p. 1-p. 3.

* cited by examiner

TIMER CALIBRATION METHOD AND ELECTRONIC DEVICE

CROSS-REFERENCE TO RELATED APPLICATION

This application claims the priority benefit of China application serial no. 202111509189.3, filed on Dec. 10, 2021. The entirety of the above-mentioned patent application is hereby incorporated by reference herein and made a part of this specification.

BACKGROUND

Technical Field

The disclosure relates to a timer calibration technique, and more particularly to a timer calibration method and an electronic device.

Description of Related Art

Many types of electronic devices support the use of offline timers to perform timing functions. However, due to the process difference of the internal chip of an electronic device and a change of use environment (for example, a change of environmental temperature), the source clock frequency used by an offline timer may fluctuate greater, causing the timer to be inaccurate. Once the offline timer is inaccurate, it may cause unexpected control behavior of an entire control system.

SUMMARY

The disclosure provides a timer calibration method and an electronic device, which may improve the accuracy of timing and/or counting performed by a timer offline.

An exemplary embodiment of the disclosure provides a timer calibration method used in an electronic device. The electronic device includes a clock device and a timer. The timer calibration method includes: performing a fitting operation according to a clock frequency of the clock device and an output of the timer to generate a fitting function; obtaining a first value output by the timer; and adjusting the first value to be a second value according to the fitting function to calibrate the timer.

An exemplary embodiment of the disclosure further provides an electronic device, including a clock device, a timer, and a calibration circuit. The calibration circuit is coupled to the clock device and the timer. The calibration circuit is configured to: perform a fitting operation according to a clock frequency of the clock device and an output of the timer to generate a fitting function; obtain a first value output by the timer; and adjust the first value to be a second value according to the fitting function to calibrate the timer.

Based on the above, a fitting function may be generated by performing a fitting operation according to a clock frequency of a clock device and an output of a timer. After obtaining a first value output by the timer, the first value may be adjusted to be a second value according to the fitting function so as to calibrate the timer. In this way, the accuracy of timing and/or counting performed by a timer offline may be improved.

DESCRIPTION OF THE EMBODIMENTS

Figure 1:
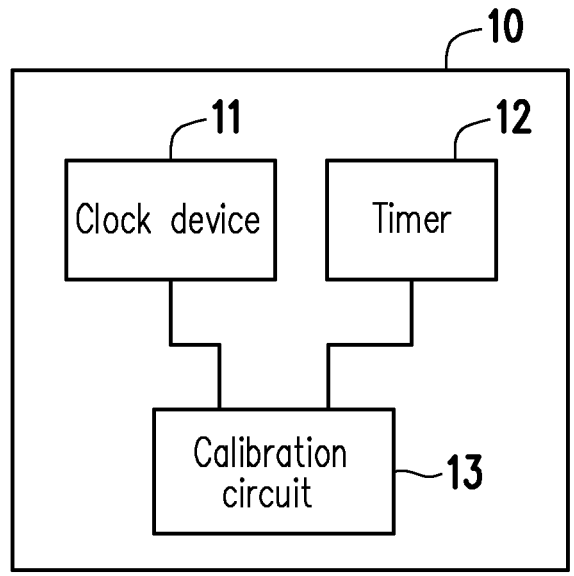
FIG. 1 is a schematic diagram of an electronic device according to an exemplary embodiment of the disclosure.

FIG. 1 is a schematic diagram of an electronic device according to an exemplary embodiment of the disclosure. Please refer to FIG. 1. The electronic device 10 may be disposed in various electronic devices with data processing and control functions, including a smart phone, a tablet computer, a notebook computer, a desktop computer, an industrial computer, a server, or a game console. The electronic device 10 may be implemented as various control chips or control circuits, including a single chip microcomputer, a single chip controller, a single chip microcontroller, a micro control unit, and a microcontroller.

The electronic device 10 may include a clock device 11, a timer 12 and a calibration circuit 13. The clock device 11 may include various processors such as a central processing unit (CPU). The timer 12 may include various timing and/or counting circuits with timing and/or counting functions. In an exemplary embodiment, the timer 12 may include a counter. The timer 12 may be configured to implement offline timing and/or counting. In an exemplary embodiment, the timer 12 is also referred to as an offline timer.

The calibration circuit 13 is coupled to the clock device 11 and the timer 12. It should be noted that in the exemplary embodiment, the calibration circuit 13 is independently disposed outside the clock device 11 and the timer 12. For example, the calibration circuit 13 may include a programmable general-purpose or special-purpose microprocessor, a digital signal processor (DSP), a programmable controller, an application specific integrated circuit (ASIC), a programmable logic device (PLD), or other similar devices or a combination of these devices. However, in another exemplary embodiment, the calibration circuit 13 may also be disposed in the clock device 11 or the timer 12 in the form of software or hardware, which is not limited by the disclosure.

The calibration circuit 13 may perform a fitting operation according to a clock frequency of the clock device 11 and an output of the timer 12 to generate a fitting function. Later, in a timing and/or counting operation, the calibration circuit 13 may obtain a value output by the timer 12 (also referred to as a first value). The calibration circuit 13 may adjust the first value to be another value (also referred to as a second value) according to the fitting function to calibrate the timer 12. That is, the calibration circuit 13 may calibrate the output of the timer 12 offline according to an internal machine cycle of the electronic device 10 (for example, the clock frequency of the clock device 11) without considering a calibration parameter provided by an external network (for example, global time). In an exemplary embodiment, the electronic device 10 may further include a storage circuit, a power management circuit, and various input/output (I/O) interfaces, which is not limited by the disclosure.

In an exemplary embodiment, the clock frequency of the clock device 11 includes a clock frequency of a processor inside the clock device 11. For example, the processor inside the clock device 11 may operate based on a reference clock, and the calibration circuit 13 may obtain the clock frequency of the clock device 11 according to a frequency of the reference clock.

In an exemplary embodiment, the timer 12 may perform timing and/or counting according to a frequency of a source clock. However, the frequency of the source clock is more susceptible to changes in an external environment (for example, environmental temperature) than the clock frequency of the processor inside the clock device 11, which causes timing and/or counting results of the timer 12 to be inaccurate. In an exemplary embodiment, calibrating the output of the timer 12 according to the internal machine cycle of the electronic device 10 (for example, the clock frequency of the clock device 11) may effectively improve the timing and/or counting accuracy of the timer 12.

In an exemplary embodiment, the calibration circuit 13 may obtain multiple measured values (also referred to as first measured values) based on the output of the timer 12 within a sampling time range (also referred to as a preset sampling range). For example, a certain first measured value may reflect that the timing result obtained according to the output of the timer 12 is 3 microseconds (µs). Moreover, the calibration circuit 13 may obtain multiple measured values (also referred to as second measured values) based on the clock frequency of the clock device 11 within the preset sampling range. For example, a certain second measured value may reflect that the timing result obtained according to the clock frequency of the clock device 11 is 5 microseconds. The calibration circuit 13 may perform the fitting operation according to the first measured values and the second measured values to generate the fitting function. In particular, the fitting function may be used to try to or as much as possible convert the first measured values into the second measured values.

Figure 2:
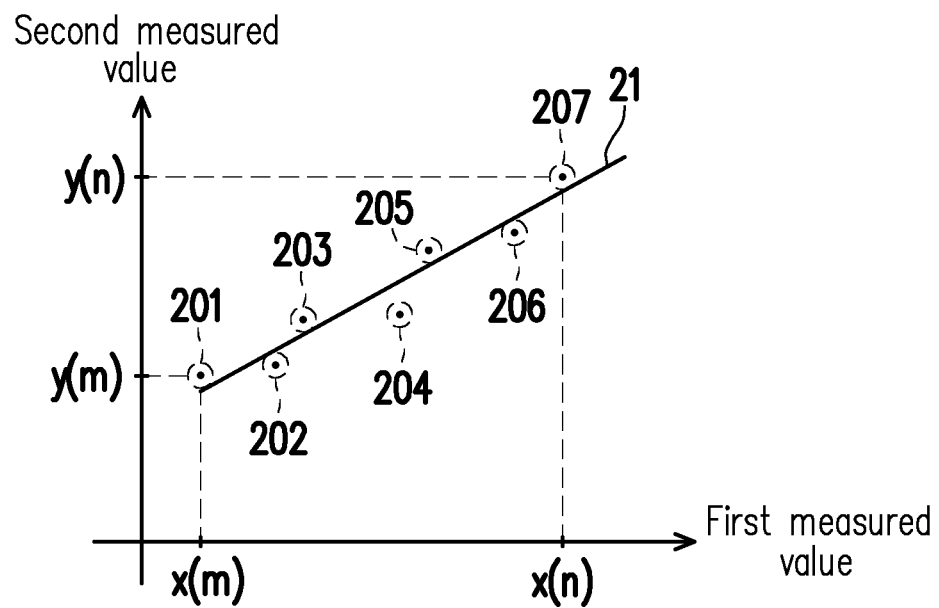
FIG. 2 is a schematic diagram of a fitting curve corresponding to a fitting function according to an exemplary embodiment of the disclosure.

FIG. 2 is a schematic diagram of a fitting curve corresponding to a fitting function according to an exemplary embodiment of the disclosure. Please refer to FIG. 2. The horizontal axis in FIG. 2 represents the measured value obtained according to the output of the timer 12 (i.e., the first measured value), and the vertical axis represents the measured value obtained according to the clock frequency of the clock device 11 (i.e., the second measured value). Within the preset sampling range (for example, between sampling points m and n), the measured values (including the first measured values and the second measured values) individually measured based on multiple (for example, 7) sampling points may be represented by measurement points 201 to 207. For example, the horizontal axis and the vertical axis of the measurement point 201 correspond to the first measured value x(m) and the second measured value y(m) measured at the sampling point m, respectively. Alternatively, the horizontal axis and vertical axis of the measurement point 207 correspond to the first measured value x(n) and the second measured value y(n) measured at the sampling point n, respectively. In addition, from another perspective, the measurement points 201 to 207 may be used to represent the distribution of the first measured values and the second measured values measured within the preset sampling range.

The calibration circuit 13 may perform a fitting operation according to the first measured value and the second measured value corresponding to the measurement points 201 to 207, respectively, to obtain a fitting function. The fitting function may reflect a fitting curve 21. For example, in the fitting operation, the calibration circuit 13 may obtain a fitting function corresponding to the fitting curve 21 according to the distribution of the first sampling point, the distribution of the first measured value, and the distribution of the second measured value. The fitting function (or fitting curve 21) may be used to try to or as much as possible convert the measured first measured value into a corresponding second measured value. The fitting function may include a linear or a non-linear fitting function. For example, the fitting function (or fitting curve 21) may be used to as much as possible convert the first measured value x(m) measured at the sampling point m into the second measured value y(m). For example, it is supposed that the first measured value x(m) reflects that the timing result obtained according to the output of the timer 12 at the sampling point m is 3 microseconds, and that the second measured value y(m) reflects that the timing result obtained by the clock frequency of the clock device 11 at the sampling point m is 5 microseconds. The fitting function (or fitting curve 21) may be used to convert the timing result (i.e., 3 microseconds) corresponding to the output of the timer 12 at the sampling point m into the timing result (i.e., 5 microseconds) corresponding to the clock frequency of the clock device 11 at the sampling point m. According to the aforementioned, the fitting function (or fitting curve 21) may be used to try to or as much as possible convert the first measured value (for example, x(n)) measured at the remaining sampling points (for example, sampling point n) into the second measured value (for example, y(n)).

In an exemplary embodiment, the fitting function may be expressed as Y=k×X+b. X corresponds to the first measured value, and Y corresponds to the second measured value (Y may also be used to represent an output value of the fitting function). Moreover, k and b are parameters. For example, the parameters k and b may be obtained according to the following equations (1.1) and (1.2), respectively.

$$k = \frac{\Sigma_0^N xi \times yi - \Sigma_0^N xi \Sigma_0^N yi}{N\Sigma_0^N xi^2 - (\Sigma_0^N xi)^2} \quad (1.1)$$

$$b = \frac{\Sigma_0^N yi}{N} - k \times \frac{\Sigma_0^N xi}{N} \quad (1.2)$$

In the equations (1.1) and (1.2), xi represents the first measured value obtained at sampling point i, yi represents the second measured value obtained at sampling point i, and N represents N sampling points within the preset sampling range.

When timing and/or counting actually starts, the calibration circuit 13 may use the fitting function (or fitting curve 21) to convert the measured value output by the timer 12 (i.e., the first value) into the second value to calibrate the timer 12. In particular, the fitting function (or fitting curve 21) is obtained under the current operating environment of the timer 12, so using the fitting function (or fitting curve 21) thereafter to adjust the output of the timer 12 may effectively improve the timing and/or counting accuracy of the timer 12 offline.

In an exemplary embodiment, the preset sampling range may be further divided into multiple sampling ranges (for example, a first sampling range and a second sampling range). At the same time, the fitting function may include a fitting function corresponding to the first sampling range (also referred to as a first fitting function) and a fitting function corresponding to the second sampling range (also referred to as a second fitting function). The first fitting function may be the same as or different from the second fitting function. For example, at least part of the parameters adopted by the first fitting function may be different from at least part of the parameters adopted by the second fitting function.

Figure 3:
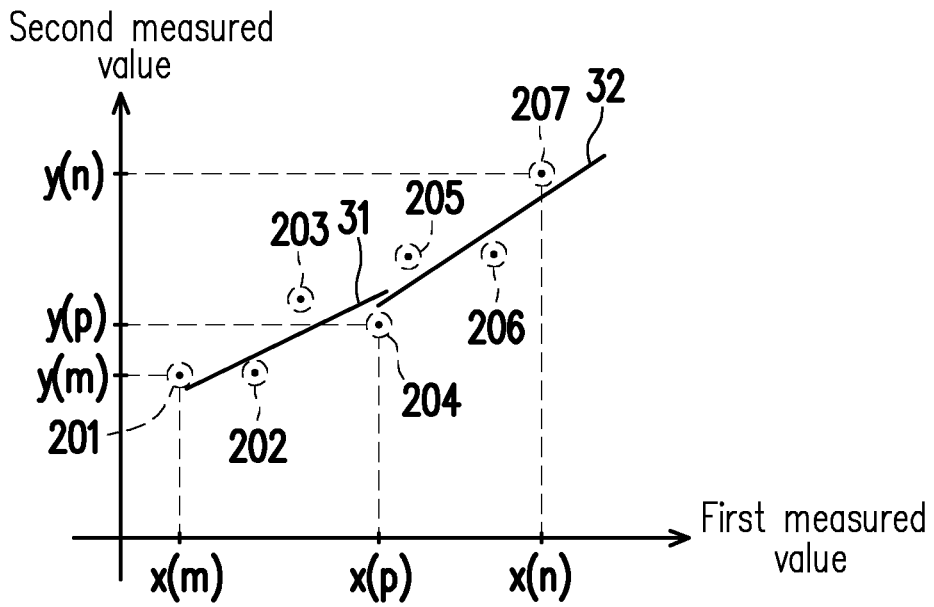
FIG. 3 is a schematic diagram of a fitting curve corresponding to a fitting function according to an exemplary embodiment of the disclosure.

FIG. 3 is a schematic diagram of a fitting curve corresponding to a fitting function according to an exemplary embodiment of the disclosure. Please refer to FIG. 3. The horizontal axis in FIG. 3 represents the measured value obtained according to the output of the timer 12 (i.e., the first measured value), and the vertical axis represents the measured value obtained according to the clock frequency of the clock device 11 (i.e., the second measured value).

In the exemplary embodiment, the preset sampling range may include a sampling range between sampling points m and p (i.e., the first sampling range) and a sampling range between sampling points p and n (i.e., the second sampling range). A fitting function corresponding to a fitting curve 31 (i.e., the first fitting function) may be obtained according to the measurement points 201 to 204. A fitting function corresponding to a fitting curve 32 (i.e., the second fitting function) may be obtained according to the measurement points 204 to 207. For example, the first fitting function may be expressed as $Y=k1 \times X+b1$, and the second fitting function may be expressed as $Y=k2 \times X+b2$. k1 may be the same as or different from k2. b1 may be the same as or different from b2. For the operation details of how to obtain the first fitting function and the second fitting function, please refer to the exemplary embodiment of FIG. 2, which is not repeated herein.

In an exemplary embodiment of FIG. 2, the calibration circuit 13 may detect at least one deviation value output based on the fitting function (or fitting curve 21) within the preset sampling range. The logical distance between the deviation value and the fitting curve 21 is greater than a preset value. Taking FIG. 2 as an example, it is supposed that the logical distance between any of the measurement points 201 to 203 and 205 to 207 and the fitting curve 21 is not greater than the preset value, and that only the logical distance between the measurement point 204 and the fitting curve 21 is greater than the preset value. In response to the situation where the logical distance between the measurement point 204 and the fitting curve 21 is greater than the preset value, the calibration circuit 13 may determine the first measured value (i.e., x(p)) and the second measured value (i.e., y(p)), both corresponding to the measurement point 204, as the deviation value. The calibration circuit 13 may divide the preset sampling range into the first sampling range and the second sampling range according to the sampling point (for example, sampling point p) corresponding to the deviation value, as shown in FIG. 3.

It should be noted that in other exemplary embodiments, the preset sampling range may be further divided into more sampling ranges, and different sampling ranges may correspond to different fitting functions. For the related operation details, please refer to the exemplary embodiment in FIG. 3, which is not repeated herein. When timing and/or counting operations are performed thereafter, the calibration circuit 13 may select a suitable fitting function to adjust the output of the timer 12 according to different measured time lengths, thereby improving the accuracy of timing and/or counting performed by the timer 12 offline.

In an exemplary embodiment, the calibration circuit 13 may detect a change in an environmental parameter. For example, the environmental parameter may include environmental temperature, the temperature of the electronic device 10, and/or the use time of the electronic device 10, etc., and the type of the environmental parameter is not limited thereto. The calibration circuit 13 may update the fitting function according to the change in the environmental parameter. For example, in response to the change in the environmental temperature exceeding a first critical value, the change in the temperature of the electronic device 10 exceeding a second critical value, and/or the use time of the electronic device 10 exceeding a third critical value, the calibration circuit 13 may update the fitting function. Alternatively, in an exemplary embodiment, the calibration circuit 13 may detect how long the fitting function has not been updated. In response to the time during which the fitting function has not been updated exceeds a fourth critical value, the calibration circuit 13 may update the fitting function. The updated fitting function may maintain or further improve the timing and/or counting accuracy of the timer 12 in the current operating environment. The operation of updating the fitting function may be the same as or similar to the operation of generating the fitting function described in the exemplary embodiment of FIG. 2 and/or FIG. 3, and thus is not repeated herein.

Figure 4:
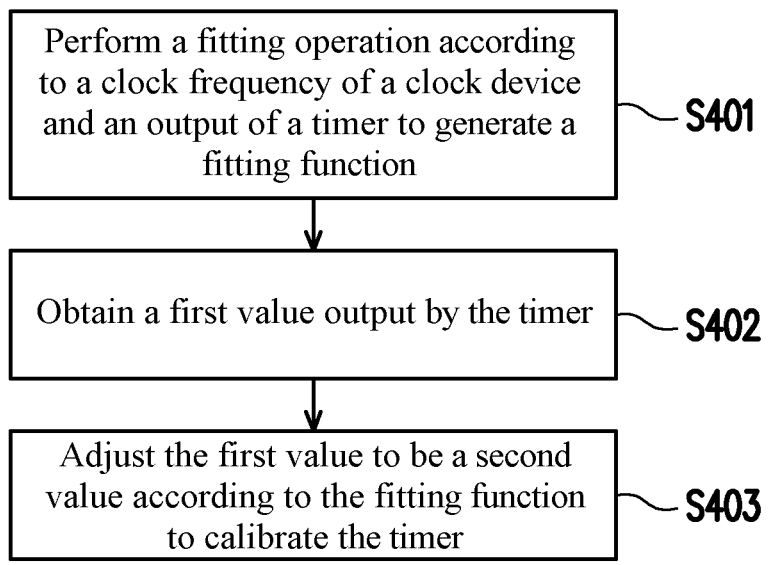
FIG. 4 is a flowchart of a timer calibration method according to an exemplary embodiment of the disclosure.

FIG. 4 is a flowchart of a timer calibration method according to an exemplary embodiment of the disclosure. Please refer to FIG. 4. In step S401, a fitting operation is performed according to a clock frequency of a clock device and an output of a timer to generate a fitting function. In step S402, a first value output by the timer is obtained. In step S403, the first value is adjusted to be a second value according to the fitting function to calibrate the timer.

Since each step in FIG. 4 has been described in detail as the above, the description is not repeated herein. Note that each step in FIG. 4 may be implemented as program codes or circuits, which is not limited by the disclosure. In addition, the method in FIG. 4 may be used in conjunction with the above exemplary embodiments, or may be used alone, which is not limited by the disclosure.

In summary, the embodiments proposed by the disclosure may adjust the output of the timer according to the relatively stable clock frequency in the clock device. In this way, the accuracy of timing and/or counting performed by the timer offline may be improved.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the following claims.

What is claimed is:

1. A timer calibration method used in an electronic device, the electronic device comprising a clock device and a timer, and the timer calibration method comprising:
   performing a fitting operation according to a clock frequency of the clock device and an output of the timer to generate a fitting function;
   obtaining a first value output by the timer; and
   adjusting the first value to be a second value according to the fitting function to calibrate the timer,
   wherein performing the fitting operation according to the clock frequency of the clock device and the output of the timer to generate the fitting function comprises:
      obtaining a plurality of first measured values based on the output of the timer within a preset sampling range;
      obtaining a plurality of second measured values based on the clock frequency of the clock device within the preset sampling range; and performing the fitting operation according to the plurality of first measured values and the plurality of second measured values to generate the fitting function, wherein
the fitting function is used to convert the plurality of first measured values into the plurality of second measured values.

2. The timer calibration method according to claim 1, wherein the preset sampling range comprises a first sampling range and a second sampling range, and the fitting function comprises a first fitting function corresponding to the first sampling range and a second fitting function corresponding to the second sampling range, and the first fitting function is different from the second fitting function.

3. The timer calibration method according to claim 2, wherein the fitting function reflects a fitting curve, and the timer calibration method further comprises:
detecting a deviation value output based on the fitting function within the preset sampling range, wherein a logical distance between the deviation value and the fitting curve is greater than a preset value; and
dividing the preset sampling range into the first sampling range and the second sampling range according to a sampling point corresponding to the deviation value.

4. The timer calibration method according to claim 1, wherein the clock device comprises a processor, and the clock frequency of the clock device comprises a clock frequency of the processor.

5. The timer calibration method according to claim 1, further comprising:
detecting a change of an environmental parameter; and
updating the fitting function according to the change of the environmental parameter.

6. An electronic device, comprising:
a clock device;
a timer; and
a calibration circuit coupled to the clock device and the timer, wherein
the calibration circuit is configured to:
perform a fitting operation according to a clock frequency of the clock device and an output of the timer to generate a fitting function;
obtain a first value output by the timer; and
adjust the first value to be a second value according to the fitting function to calibrate the timer,
wherein performing the fitting operation according to the clock frequency of the clock device and the output of the timer to generate the fitting function comprises:
obtaining a plurality of first measured values based on the output of the timer within a preset sampling range;
obtaining a plurality of second measured values based on the clock frequency of the clock device within the preset sampling range; and
performing the fitting operation according to the plurality of first measured values and the plurality of second measured values to generate the fitting function, wherein the fitting function is used to convert the plurality of first measured values into the plurality of second measured values.

7. The electronic device according to claim 6, wherein the preset sampling range comprises a first sampling range and a second sampling range, and the fitting function comprises a first fitting function corresponding to the first sampling range and a second fitting function corresponding to the second sampling range, and the first fitting function is different from the second fitting function.

8. The electronic device according to claim 7, wherein the fitting function reflects a fitting curve, and the calibration circuit is further configured to:
detect a deviation value output based on the fitting function within the preset sampling range, wherein a logical distance between the deviation value and the fitting curve is greater than a preset value; and
divide the preset sampling range into the first sampling range and the second sampling range according to a sampling point corresponding to the deviation value.

9. The electronic device according to claim 6, wherein the clock device comprises a processor, and the clock frequency of the clock device comprises a clock frequency of the processor.

10. The electronic device according to claim 6, wherein the calibration circuit is further configured to:
detect a change of an environmental parameter; and
update the fitting function according to the change of the environmental parameter.

* * * * *